United States Patent [19]

Lowell et al.

[11] 4,432,243

[45] Feb. 21, 1984

[54] FLOW CALCULATOR WITH VELOCITY CURVE FITTING CIRCUIT MEANS

[75] Inventors: Francis C. Lowell; Thomas K. Campbell, both of Falmouth, Mass.

[73] Assignee: Ocean Research Equipment, Inc., Falmouth, Mass.

[21] Appl. No.: 198,119

[22] Filed: Oct. 17, 1980

Related U.S. Application Data

[63] Continuation of Ser. No. 16,096, Feb. 28, 1979, abandoned.

[51] Int. Cl.³ .................................................. G01F 1/66
[52] U.S. Cl. .................................. 73/861.31; 364/510
[58] Field of Search ...................... 73/861.31; 364/510

[56] References Cited

U.S. PATENT DOCUMENTS 4,109,523  8/1978  Teyssandier .................... 73/861.31

OTHER PUBLICATIONS

S. G. Fisher et al.–Modern Developments in Flow Measurement, Peter Peregrinus, Ltd., London, 1972, pp. 139–159.

Primary Examiner—Charles A. Ruehl
Attorney, Agent, or Firm—Cesari and McKenna

[57] ABSTRACT

A novel acoustic flow-measuring apparatus and method of the type comprising a plurality of pairs of transducers mounted at the walls of a pipe carrying the fluid to be measured. Each pair is formed of opposed upstream and downstream transducers which project and receive acoustic energy toward each other along an intermediate acoustic path. Circuit means are provided whereby a general velocity distribution function is particularized by a relatively simple signal processing system utilizing a curve-fitting procedure.

7 Claims, 4 Drawing Figures

FLOW CALCULATOR WITH VELOCITY CURVE FITTING CIRCUIT MEANS

This is a continuation, of application Ser. No. 016,096 filed Feb. 28, 1979, now abandoned.

BACKGROUND OF THE INVENTION

Acoustic flow meters are becoming increasingly popular in measurement of fluid flow in pipes. Good accuracy can be achieved with essentially no pressure drop due to metering; thus, pumping energy is conserved. Moreover, such flow meters can be mounted on the exteriors of pipes (albeit with some loss in accuracy) and, thus, they are desirable for use in measuring flow of hazardous materials. Further, acoustic flow meters do not increase markedly in cost with the size of the pipe being monitored. Among such flow meters are those described in U.S. Pat. Nos. 3,940,985; 3,564,912; 3,537,309; 3,697,936; 3,720,105; 3,881,352; 3,882,722; 3,886,794; 3,901,078; 2,914,998; 3,974,693; 4,024,760; 3,546,935; 3,564,912; and 3,918,304.

Nevertheless, it remains a problem to embody an improved combination of high accuracy and low cost in an acoustic flow meter. The incremental value of even a small increase in accuracy can be substantial in applications on large pipelines, e.g. large oil pipelines, petroleum refinery lines, municipal water service lines and the like. Also, such meters are of particular value in testing and calibration measurements in large hydraulic installations, e.g. in testing of large hydraulic machinery and in power plant flow installations. In some of the latter installations the pipe diameter may be 30 feet or more.

SUMMARY OF THE INVENTION

It is a principal object of the invention to provide inproved means and method for measuring pipeline flow with an effective combination of acoustical flow transducers and a relatively simple signal processing means and accuracy.

It is the object of the present invention to provide an improved method, and improved apparatus, for economical, rapid, and accurate evaluation of signals generated by acoustic flow transducers.

In the practice of the invention, a circuit means is provided to fit a generalized velocity distribution function to the velocity measurements obtained from opposed pairs of flow transducers and known boundary conditions. The precise type of velocity distribution function used can be varied depending on the precise liquid measuring problem that is encountered. The most generalized form of such a function is:

$$v(x) = a_0 + a_1 f_1(x) + a_2 f_2(x) + \ldots + a_n f_n(x) \quad (1)$$

where
x is a position along an axis in a plane transverse to the axis of the pipe in which flow is to be measured;
v(x) is the average velocity in a plane perpendicular to both the transverse plane and the x axis and located at the position x;
$f_n(x)$ are various functions of x; and
$a_n$ are coefficients whose values depend on the velocity and its distribution along the x axis.
In accordance with the invention the values of $a_n$ are determined from a limited number of discrete velocity measurements and the resultant particularized velocity distribution function is then integrated over the cross-sections of the pipe to yield the volumetric flow rate.

In this application and accompanying drawings there is shown and described a preferred embodiment of the invention and suggested various alternatives and modifications thereof, but it is to be understood that these are not intended to be exhaustive and that other changes and modifications can be made within the scope of the invention. The suggestions herein are selected and included for the purposes of illustration in order that others skilled in the art will more fully understand the invention and the principles thereof and will be able to modify it and embody it in a variety of forms, each as may be best suited in the condition of a particular case.

DETAILED DESCRIPTION OF THE INVENTION

Figure 1:
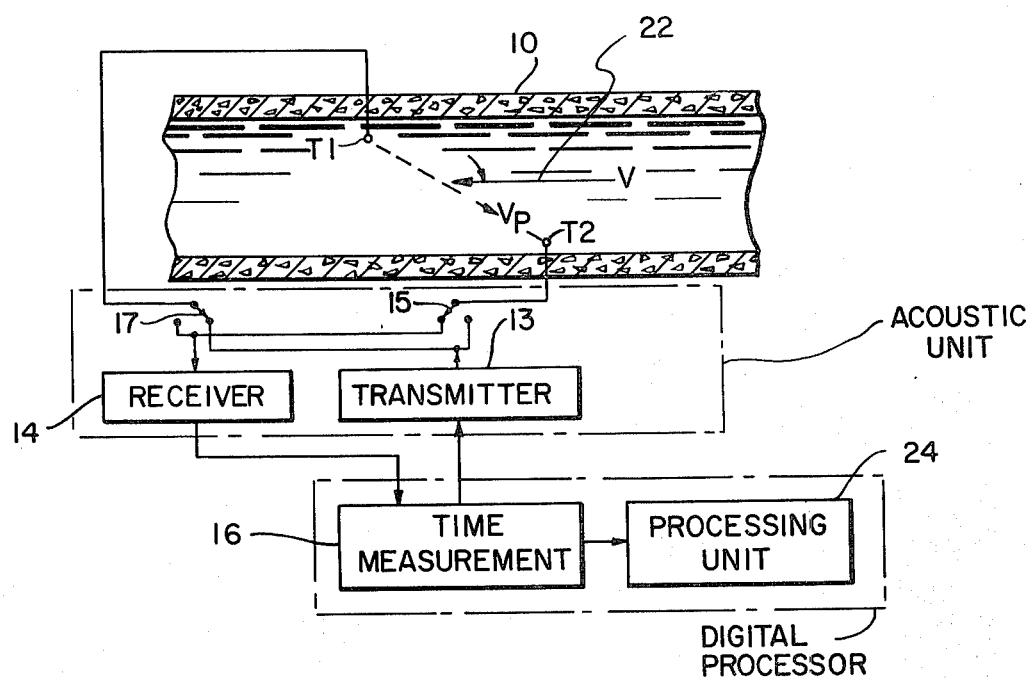
FIG. 1 is a schematic diagram of a flow-measuring system embodying the invention.

As shown in FIG. 1, a flow-measuring system embodying the invention is arranged to measure the flow of a fluid through a pipe 10. The system includes a plurality of pairs of electro-acoustical transducer, a pair T1-T2 being shown in FIG. 1. The transducers are alternately connected to a transmitter 13 and a receiver 14, respectively, by means of switches 15 and 17. As described below, a time measurement unit 16 measures the timing of signals transmitted by the transmitter 13 and received by the receiver 14 and the time measurements, in turn, are converted to flow measurements by a processing unit 24.

Figure 2:
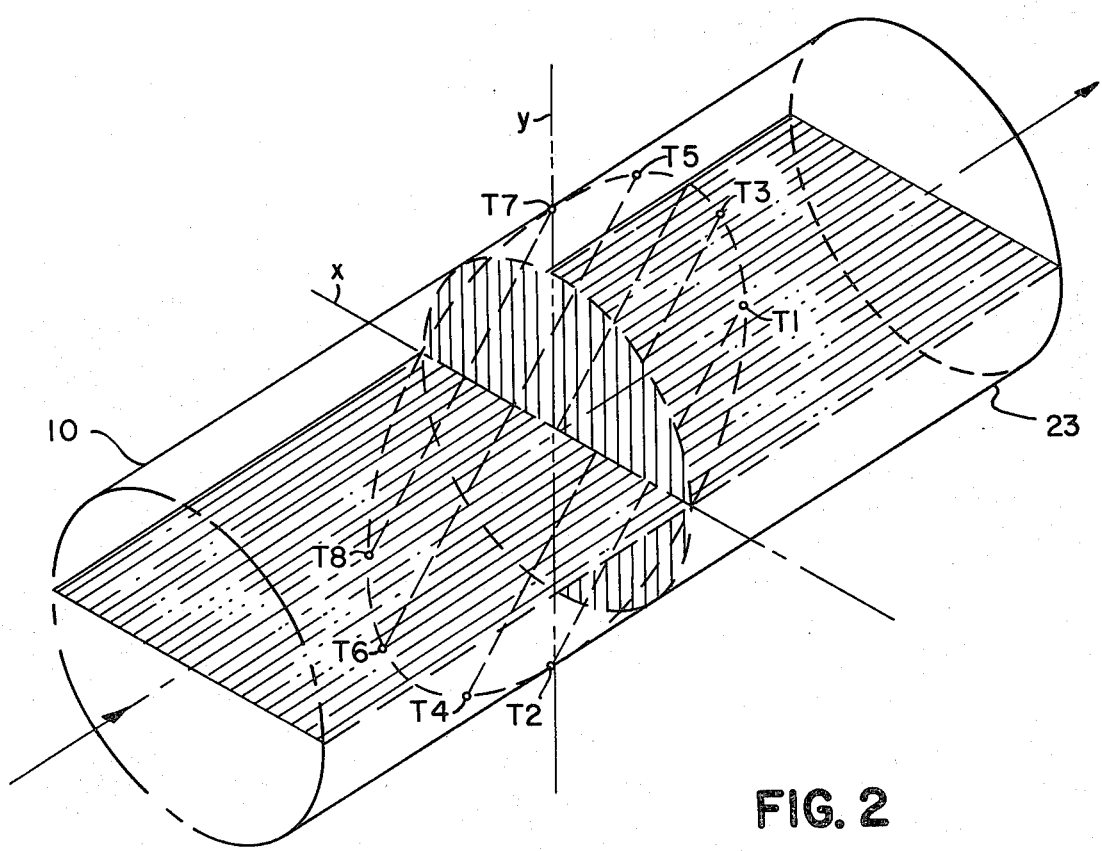
FIG. 2 illustrates typical transducer placement in a pipe.

Referring next to FIG. 2, it is seen that there are four pairs of electro-acoustical transducers positioned at the walls of a pipe 10, the transducer pairs being identified as T1 and T2; T3 and T4; T5 and T6; and T7 and T8. The transducers can be typical ultrasonic flow transducers known in the fluid-flow-measuring art. In a commonly used type of apparatus, the upstream transducers T1, T3, T5 and T7 are caused to emit acoustic pulses which are received and converted to electrical signals by the downstream transducers T2, T4, T6 and T8. The process is then repeated with transducers T2, T4, T6 and T8 transmitting and transducers T1, T3, T5, and T7 receiving. A velocity measurement for each pair is made in a known manner based upon the differences in the respective upstream and downstream transit times of the acoustic pulses transmitted between the transducers of that pair. It should be noted that since one transducer in each pair at the top wall of the pipe and the other is at the bottom wall, each velocity measurement provides an average velocity in a plane parallel to the pipe axis and passing through the two transducers. Specifically, these planes are perpendicular to the x axis in FIG. 2.

The illustrated apparatus uses the following four measured acoustic velocities and two assumed boundary values:

$v_0$ = velocity at pipe wall, at $x = x_0$, $v_1$ = velocity between T1 and T2, at $x=x_1$,
$v_2$ = velocity between T3 and T4, at $x=x_2$,
$v_3$ = velocity between T5 and T6, at $x=x_3$,
$v_4$ = velocity between T7 and T8, at $x=x_4$,
$v_5$ = velocity at opposite pipe wall, at $x=x_5$,
$x_5 - x_0$ being the pipe diameter.

It is assumed that the velocities $v_0$ and $v_5$ along the walls are zero.

The general formula (1) may, for example, represent a power series of the form:

$$v(x) = a_0 + a_1 x + a_2 x^2 + a_3 x^3 + a_4 x^4 + a_5 x^5 \tag{2}$$

wherein $f_n = x^n$. In that case the measured velocities and the boundary values can be used to produce the following six equations applying the formula (2) to the corresponding x coordinates in the pipe 10.

$$v_0 = a_0 + a_1 x_0 + a_2 x_0^2 + \ldots + a_5 x_0^5$$

$$v_1 = a_0 + a_1 x_1 + a_2 x_1^2 + \ldots + a_5 x_1^5$$

$$v_2 = a_0 + a_1 x_2 + a_2 x_2^2 + \ldots + a_5 x_2^5$$

$$v_3 = a_0 + a_1 x_3 + a_2 x_3^2 + \ldots + a_5 x_3^5$$

$$v_4 = a_0 + a_1 x_4 + a_2 x_3^2 + \ldots + a_5 x_4^5$$

$$v_5 = a_0 + a_1 x_5 + a_2 x_5^2 + \ldots + a_5 x_5^5.$$

These relationships are represented in matrix notation by: $[V] = [X][A]$ where $$[V] = \begin{bmatrix} v_0 \\ v_1 \\ v_2 \\ v_3 \\ v_4 \\ v_5 \end{bmatrix}$$

$$[A] = \begin{bmatrix} a_0 \\ a_1 \\ a_2 \\ a_3 \\ a_4 \\ a_5 \end{bmatrix}$$

and $$[X] = \begin{bmatrix} 1 & x_0 & x_0^2 & \ldots & x_0^5 \\ 1 & x_1 & x_1^2 & \ldots & x_1^5 \\ 1 & x_2 & x_2^2 & \ldots & x_2^5 \\ 1 & x_3 & x_3^2 & \ldots & x_3^5 \\ 1 & x_4 & x_4^2 & \ldots & x_4^5 \\ 1 & x_5 & x_5^2 & \ldots & x_5^5 \end{bmatrix}$$

Solving for $[A]$, it will be seen that $[A] = [X]^{-1}[V]$, where $[X]^{-1}$ is the inverse matrix of $[X]$.

The values of the coefficients $a_n$ thus calculated can then be inserted into the formula (2) to provide a particularized formula for continuous values of x.

The volumetric flow rate Q is then ascertained from the following integration:

$$Q = \int v(x) y(x) dx \tag{7}$$

wherein $y(x)$ is the transverse dimension of the pipe perpendicular to the x direction, and the limits of integration correspond with the end points $x_0$ and $x_5$.

A very accurate result is achieved with the above procedure. For example, the integration error is substantially zero for a symmetrical flow situation as epitomized by a circular pipe of unit radius and with the acoustic paths located at $$x_1 = +0.8090$$

$$x_2 = +0.3090$$

$$x_3 = -0.3090$$

$$x_4 = -0.8090.$$

(For these x values the y axis is assumed to pass through the center of the pipe cross section as in FIG. 2.) The error assessment assumes laminar flow, i.e. a condition producing a parabolic velocity distribution and a symmetrical flow. When very high Reynolds numbers are encountered (e.g. when the Reynolds number tends to infinity) in the flow to be measured, the velocity distribution is uniform and the error is also zero. In an intermediate case, when Reynolds numbers indicate a high turbulent flow, e.g., $$v = (1-r)^{\frac{1}{8}} \tag{8}$$

where r is the normalized radius, the integration error is less than 0.1%.

The foregoing processing procedure will also work with non-symmetrical velocity profiles; thus it can be readily adapted to non-circular pipes and even to open-channel flow measurements, or similarly, to pipelines which are not flowing full. In the latter situation, the boundary condition at the free surface is $dv/dy = 0$, that is, the vertical velocity gradient is zero at the surface. A measurement device is then provided to measure the elevation of the free surface of the liquid in the channel or pipe to provide the value $y(x)$. For this purpose, it is often preferred to utilize an ultrasonic level-measurement system and integrate its signal directly into the signal system of the invention. However, any type of transducer which is convenient and appropriate for a particular application can be used to detect the level.

Another example of flow measurement according to the invention is a simplified arrangement which takes into account several inherent characteristics of most flow situations in pipelines. Specifically, in the usual pipeline, having a symmetrical cross-section, the velocity distribution is both symmetrical and continuous. Also, one can assume a zero gradient in velocity at the center of the pipe and, as before, zero velocity at the pipe walls. Further assumptions that are justified in most pipeline flow situations include:

1. a finite velocity gradient at the pipe wall; and
2. a monotonic velocity increase from each pipe wall to the center, i.e. to the x coordinate of zero velocity gradient.

The following is a suitable relationship with which to treat such a flow system, assuming a unit pipe radius and a centrally-located y axis:

$$v(x) = a_1(1-x^2) + a_2(1-x^{64}). \tag{9}$$

This relationship utilizes a lower order term, $1-x^2$, to fit the parabolic distribution which characterizes laminar flow. The higher order term, $1-x^{64}$, produces a good fit with an approached-plug-flow distribution, i.e. an almost uniform velocity distribution across the pipe. Those skilled in the art may vary the terms somewhat as is applicable to a given flow situation.

Clearly, the advantage of manipulating signals according to the formula (9) is that it requires processing only a 2×2 matrix rather than the 6×6 matrix used with the formula (2) discussed above. Under the flow conditions used in discussing error resulting from use of formula (2), the integration errors for the formula (9) embodiment are as follows:

| Laminar flow: | error = 0% |
|---|---|
| Plug flow: | error = 0.3% |
| Fully developed Turbulent flow | error - 0.18% |

Figure 4:
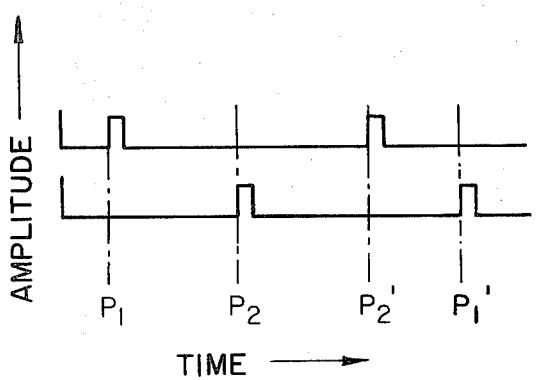
FIG. 4 shows representative pulse timing signals for a pair of acoustical transducers.

FIGS. 1 and 4 illustrate how signals from a pair of acoustic transducers can be advantageously processed to achieve a time measurement. The time-measuring arrangement is described with respect to a single one of the four pairs of transducers, i.e. with respect to transducers T1 and T2. A signal from the time measurement unit 16 initiates an electrical signal from the transmitter 13. A resulting acoustical signal transmitted from transducer T1 is received by T2 and the resulting electrical signal from transducer T2 arrives at the receiver 14. To accomplish this, the switches 15 and 17 are positioned so that receiver 14 is connected to transducer T2 and transmitter 13 is connected to transducer T1. The time measurement unit 16 then measures the acoustic propogation time between T1 and T2, and after the switches 15 and 17 are reversed, it measures the time between T2 and T1.

The acoustical transmission times from transducer T1 to transducer T2 and from transducer T2 to transducer T1 will be different and, in particular, will be a function of the average fluid velocity intersecting the path between the transducers T1 and T2. These differences in time are due to the fact that, when the acoustic signal and fluid have velocity components in the same direction, these components will add to each other and, when the velocity components are in the opposite direction, they will subtract. The two transit times are used to calculate a line velocity reading according to the well-known formula, $$v = C \frac{\Delta t}{t^{-2}} \quad (10),$$

where $\Delta t$ is the difference between upstream and downstream transit times between T1 and T2, t is the average of these transit times and C is a constant which is a function of timing frequency, the path length and the angle between the acoustic path and the direction of flow.

More specifically, with reference to FIG. 1 and FIG. 4, the time measurement unit 16 emits a timing pulse P1 to the transmitter 13 and essentially immediately the transmitter causes the transducer T1 to emit a corresponding acoustical pulse. Subsequently, the transducer T2 receives the acoustical pulse and applies a corresponding electrical signal to the receiver 14 essentially simultaneously with the receipt of the acoustical pulse. The unit 16 measures the elapsed time between the pulses P1 and P2. Next, with the switches 15 and 17 reversed, the time measurement unit 16 emits a pulse P2' to the transmitter 13 causing an acoustical signal to be transmitted from the transducer T2 to the transducer T1 with the receiver 14 transmitting a corresponding electrical pulse (P1') back to the measurement unit 16. The measurement 16 measures the elapsed time between the pulses P2' and P1' and the elapsed times are converted by the processing unit 24 to a velocity measurement in accordance with the formula 10.

A sequencer (not shown) operating under the control of the processing unit 24 then causes the transmitter 13 and receiver 14 to be connected to the transducer pair T3-T4 where the velocity measurement is repeated. It is then repeated again for the transducer pairs T5-T6 and T7-T8.

Figure 3:
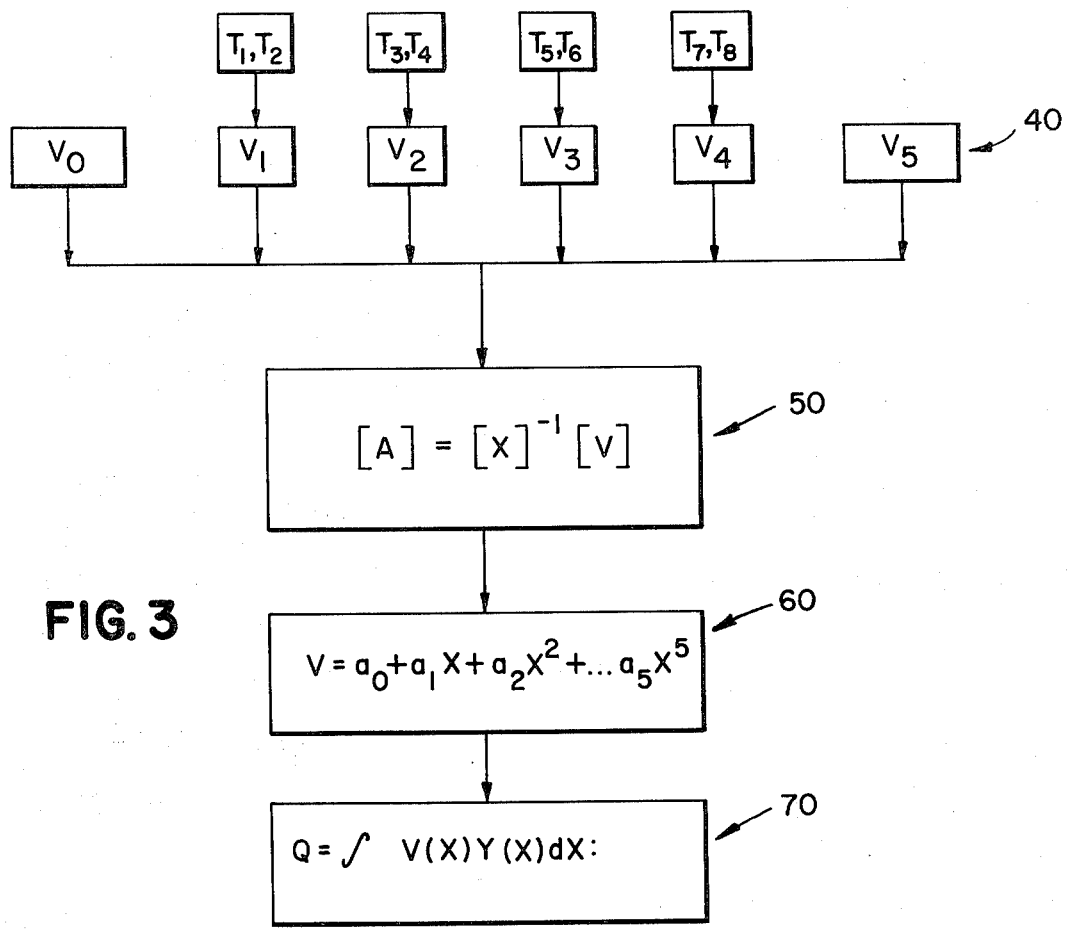
FIG. 3 is a schematic diagram of circuitry used to perform calculations resulting in the generation of a volumetric flow rate signal according to the invention.

The time-measuring and velocity calculating steps are shown at 40 in FIG. 3, the boxes $V_1$-$V_4$ indicating the stored results of the velocity measurements and the boxes $V_0$ and $V_5$ indicating the stored boundary value velocities. Next the processing unit performs the matrix manipulation indicated at 50 in FIG. 3 to determine the values of the coefficients $a_n$, resulting in the particularized velocity formula indicated at 60. Finally, the processing unit performs the integration indicated at 70 to determine the volumetric flow rate in the pipe 10 (FIG. 1).

The details of the digital processor 24 of FIG. 1 have been omitted since the construction of a processor operating as described above is well known to those skilled in the art. Since the processor is dedicated to repetitive performance of the same computational routine it can be constructed with a number of commercially available logic units. Alternatively, it can take the form a fixed-program microprocessor.

It will thus be seen that the objects set forth above have been efficiently attained.

It is also to be understood that the following claims are intended to cover all of the generic and specific features of the invention herein described and all statements of the scope of the invention which might be said to fall therebetween.

What is claimed is:

1. A flow meter for measuring volume of flow in a conduit, said flowmeter comprising
   (a) acoustic means for obtaining measurements of fluid velocity along a plurality of paths in said conduit
   (b) signal processing means for
      (1) fitting said velocity measurements to a general relationship of the form $$x(x) = a_0 + a_1 f_1(x) + a_2 f_2(x) + \ldots + a_n f_n(x)$$

where x represents a position along an axis transverse to the direction of said flow, the "a" values are coeefficients whose values depend on the velocity and its distribution along the x axis and v(x) represents the velocity at that position, by solving for the "a" values in said relationship, and
      (2) integrating said relationship according to the formula $$Q = \int v(x) y(x) dx$$

where y(x) represents the dimension of the flowing fluid transverse to both said axis and said flow and Q is the volumetric flow rate.

2. A flow meter for measuring volume of flow in a cylindrical section of pipe, said flowmeter comprising
   (a) acoustic means for obtaining measurements of fluid velocity along a plurality of symmetrically disposed predetermined paths in said pipe;
   (b) signal processing means for (1) fitting said velocity measurements and known boundary velocity values to a relationship of the form $$v(x) = a_1(1-x^n) + a_2(1-x^m),$$

where x represents a position along an axis transverse to the direction of said flow and referenced to the centr of said pipe and v(x) represents the velocity at that position, "n" and "m" are integers, $a_1$ and $a_2$ are coefficients whose values depend on the velocity and its distribution along the x axis, by solving for the "$a_1$" and "$a_2$" values in said relationship and (2) integrating the relationship with the calculated "$a_1$" and "$a_2$" according to the formula $$Q = \int v(x) y(x) dx$$

where y(x) represents the dimension of the flowing fluid transverse to both said axis and the direction of flow and Q is the volumetric flow rate;

(c) means for displaying the volumetric flow rate Q.

3. A flowmeter as in claim 2 wherein n is 2 and m is 64, in which the velocity relationship is:

$$v(x) = a_1(1-x^2) + a_2(1-x^{64}).$$

4. A method of measuring volume of flow in a conduit comprising the steps of (a) obtaining measurements of fluid velocity along a plurality of paths in said conduits;

(b) fitting said velocity measurements and information relating to positions thereof to a general relationship of the form $$v(x) = a_0 + a_1 f_1(x) + a_2 f_2(x) + \ldots + a_n f_n(x)$$

where x represents a position along an axis transverse to the direction of said flow, the "a" values are coefficients whose values depend on the velocity and its distribution along the x axis, and v(x) represents the velocity at that position, by solving for the "a" values in said relationship; and (c) integrating said relationship with the calculated "a" values according to the relationship $$Q = \int v(x) y(x) dx$$

where y(x) represents the dimension of the flowing fluid transverse to both said axis and said flow and Q is the volumetric flow rate.

5. A method of measuring volume of flow in a conduit comprising the steps of (a) obtaining measurements of fluid velocity along a plurality of paths in said conduit;

(b) fitting said velocity measurements to a relationship of the form $$v(x) = a_1(1-x^n) + a_2(1-x^m),$$

where "x" represents a position along an axis transverse to the direction of said flow and referenced to the center of said pipe, "n" and "m" are integers, $a_1$ and $a_2$ are coefficients whose values depend on the velocity and its distribution along the x axis, and v(x) represents the velocity at that position, by solving for the "$a_1$" and "$a_2$" values in said relationship; and (c) integrating said relationship with the calculated "a" values according to the relationship $$Q = \int v(x) y(x) dx$$

where y(x) represents the dimension of the flowing fluid transverse to both said axis and said flow direction and Q is the volumetric flow rate.

6. The method as in claim 5 wherein n is 2 and m is 64, whereby the velocity relationship is $$v(x) = a_1(1-x^2) + a_2(1-x^{64}).$$

7. A flow meter for measuring volume of flow in a conduit, said flowmeter comprising (a) acoustic means for obtaining measurements of fluid velocity along a plurality of paths in said conduit, (b) signal processing means for (1) fitting said velocity measurements to a polynomial expression relating velocity to position along an axis transverse to the direction of said flow, and (2) forming a product by multiplying said polynomial expression by an expression relating the transverse dimension of said conduit as a function of position along said axis and transverse to the direction of flow, and (3) integrating said product over said axis.

* * * * *